(12) United States Patent
Kurosawa

(10) Patent No.: US 8,117,633 B2
(45) Date of Patent: Feb. 14, 2012

(54) COMMUNICATION APPARATUS AND ITS CONTROL METHOD AND PROGRAM

(75) Inventor: Takahiro Kurosawa, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1074 days.

(21) Appl. No.: 11/614,208

(22) Filed: Dec. 21, 2006

(65) Prior Publication Data

US 2007/0147777 A1 Jun. 28, 2007

(30) Foreign Application Priority Data

Dec. 28, 2005 (JP) ................................ 2005-380169

(51) Int. Cl.
*H04H 60/33* (2008.01)
*H04H 60/45* (2008.01)
*H04N 7/16* (2011.01)
*H04N 7/18* (2006.01)

(52) U.S. Cl. .................. 725/25; 725/9; 725/11; 725/28; 725/29; 725/74

(58) Field of Classification Search ...................... 725/81
See application file for complete search history.

(56) References Cited

U.S. PATENT DOCUMENTS

| 6,697,105 | B1 | 2/2004 | Kato et al. ................. 348/211.6 |
| 7,324,551 | B1* | 1/2008 | Stammers ..................... 370/468 |
| 2003/0001978 | A1* | 1/2003 | Smith et al. .................... 348/714 |
| 2004/0117836 | A1* | 6/2004 | Karaoguz et al. ............... 725/81 |
| 2005/0010649 | A1* | 1/2005 | Payne et al. .................... 709/217 |
| 2005/0155077 | A1* | 7/2005 | Lawrence et al. ............. 725/109 |

FOREIGN PATENT DOCUMENTS

| JP | 09-289607 | 11/1997 |
| JP | 2001-175540 A | 6/2001 |
| JP | 2001-298730 A | 10/2001 |
| JP | 2005-025559 A | 1/2005 |

OTHER PUBLICATIONS

The above references were cited in a Aug. 15, 2011 Japanese Office Action, which is enclosed without English Translation, that issued in Japanese Patent Application No. 2005-380169.

* cited by examiner

*Primary Examiner* — Pankaj Kumar
*Assistant Examiner* — Justin Shepard
(74) *Attorney, Agent, or Firm* — Cowan, Liebowitz & Latman, P.C.

(57) ABSTRACT

In a network including a source of video contents and a playback terminal to receive video contents distributed from the source of video contents and play back the video contents, information on viewing state of video contents is collected and the collected information is stored. Then access right of the playback terminal for the video contents is set based on the stored information on viewing state.

11 Claims, 17 Drawing Sheets

COMMUNICATION APPARATUS AND ITS CONTROL METHOD AND PROGRAM

BACKGROUND OF THE INVENTION

1. Field of the Invention

The present invention relates to a technique of video data distribution by communication, and more particularly, to video content access control using communication log information.

2. Description of the Related Art

Conventionally known is a technique of distributing a live video image obtained by a remote-controllable camera using a communication infrastructure such as the Internet, and enabling an observer of the video image to designate settings, operation and the like of the camera via the Internet (U.S. Pat. No. 6,697,105 (Japanese Patent Application Laid-Open No. Hei 09-289607)). In some of such video distribution systems, a user can control camera operations including panning, tilting, zooming and backlight correction, in addition to the video data distribution, via a network. Further, in some of the video distribution systems, having a camera access control function, camera control and video distribution can be limited in correspondence with a user's access right.

Further, in some of the video distribution systems, an image sensing area can be limited by controlling the camera. For example, a privileged user can utilize all the zooming functions of the camera, however, other users can utilize only a part of the zooming functions (e.g., tele (optical zooming maximum value) cannot be used). Such limitation is also imposed on panning and tilting functions. Note that a network camera integrated with an image sensing device such as a camera is technically different from a camera server to distribute a video image obtained with a separate camera, however, in the specification of the present application, they are used in approximately the same meaning.

In recent years, a large number of video contents are easily generated in accordance with popularization of digital cameras and digital video recorders and introduction of plural home video equipments. Further, video contents are shared via a home network. At this time, access control/disclosure setting with respect to personal video contents managed by respective family members are troublesome but cannot be omitted. Especially, when video contents are shared via a home network, a non-PC device having a poor operation interface is often used. As a result, the above problem is more serious when it is difficult to operate the access control/disclosure setting with respect to personal video contents.

SUMMARY OF THE INVENTION

The present invention has been made to address the above conventional problems, and provides a communication apparatus, its control method and program to reflect a communication status and communication log information of a video content in access control of the video content.

According to the present invention, there is provided a communication apparatus comprising:

a collection unit configured to collect information on viewing state of video contents in a network including a source of video contents and a playback terminal to receive video contents distributed from the source of video contents and play back the video contents;

a storage unit configured to store the information collected by the collection unit; and an access right setting unit configured to set access right of the playback terminal for the video contents based on the information on the viewing state stored in the storage unit.

Further, according to the present invention, there is provided a communication apparatus control method, comprising:

a collection step of collecting information on viewing state of video contents in a network including a source of video contents and a playback terminal to receive video contents distributed from the source of video contents and play back the video contents;

a storage step of storing the information collected in the collection step; and an access right setting step of setting access right of the playback terminal for the video contents based on the information on the viewing state stored in the storage step.

Further features of the present invention will become apparent from the following description of exemplary embodiments with reference to the attached drawings.

BRIEF DESCRIPTION OF THE DRAWINGS

The accompanying drawings, which are incorporated in and constituted a part of the specification, illustrate embodiments of the invention and, together with the description, serve to explain the principles of the invention.

DESCRIPTION OF THE EMBODIMENTS

The preferred embodiments of the present invention will be described below in detail with reference to the accompanying drawings. The following embodiments do not limit the claims of the present invention, and not all combinations of features described in the embodiments are essential in solving means of the present invention.

First Embodiment

[Automatic Access Control Setting Reflecting Communication Log]

In the first embodiment, when a video content originated from a video source is played back by a client (operation and display terminal, hereinbelow, referred to as an "operation terminal"), communication status and communication log information are collected in a network access point (hereinbelow, abbreviated as an "AP"), thereby video content access control is simplified. Note that the video content originating side (source side) is, e.g., a video distribution apparatus (101 in FIG. 1) attachable/detachable to/from a network camera or an image sensing device (206: FIG. 2). The image sensing device 206 may be, e.g., a widely-used digital camera or digital video camera. The operation terminal may be a PC or the like having a network television and a video reception and playback software. Especially, in the present embodiment, an AP 104 (FIG. 1) automatically reflects attribute information and playback time of a video playback request originator and performs access control and access limitation on a video content.

Figure 1:
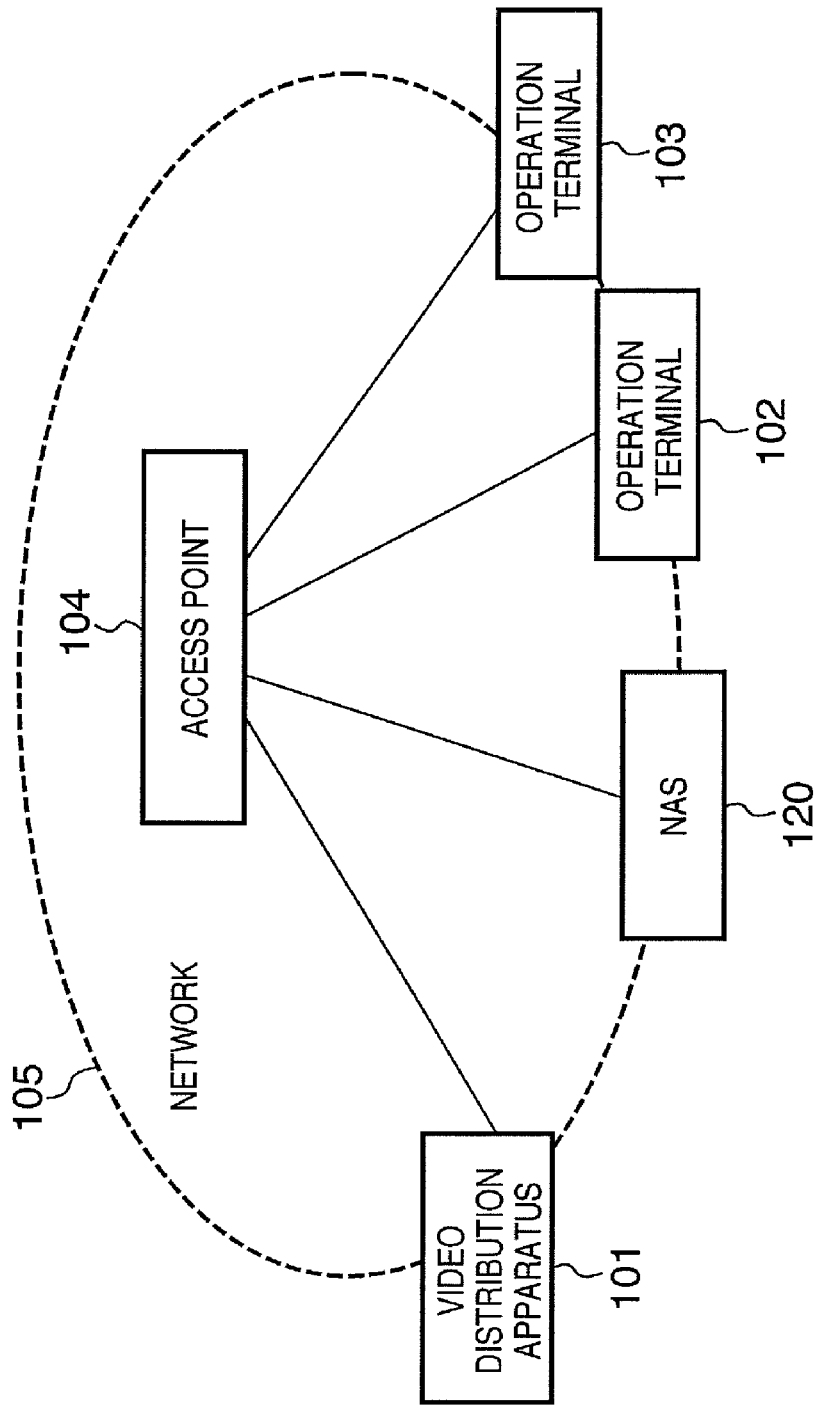
FIG. 1 is a block diagram showing a system configuration according to a first embodiment of the present invention.
Figure 2:
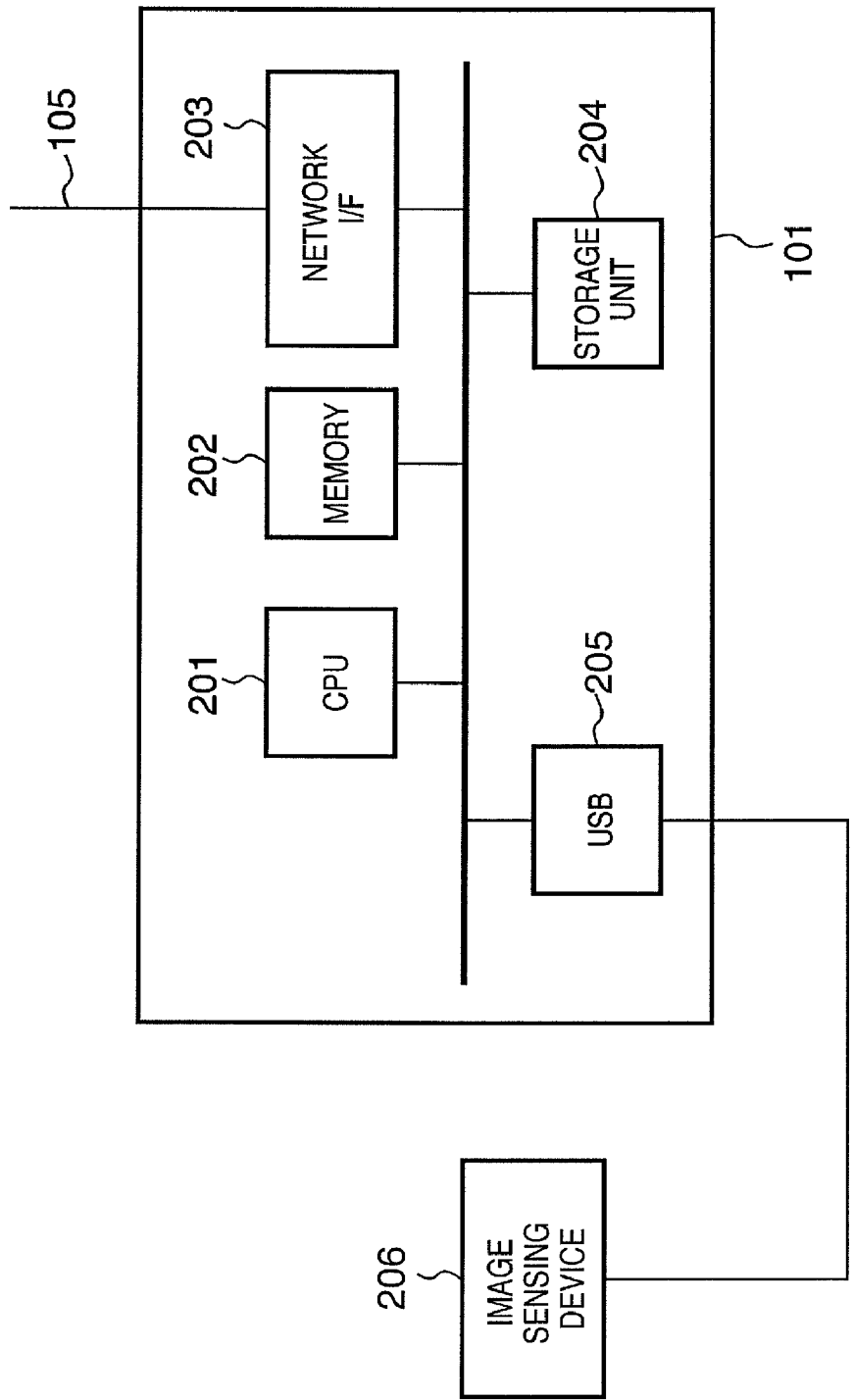
FIG. 2 is a block diagram showing an example of the hardware construction of a video distribution apparatus according to the first embodiment.

FIG. 1 illustrates a system configuration according to the first embodiment of the present invention.

The video distribution apparatus 101, which is a video contents originator, distributes video and audio information via a network 105. Operation terminals 102 and 103, which are video viewers (clients), receive and playback video and audio information distributed from the video distribution apparatus 101. An access point 104 is the AP (network access point) according to the present embodiment. Note that as shown in FIG. 17, a digital camera 110 may be removably attached to the Video distribution apparatus 101.

Figure 17:
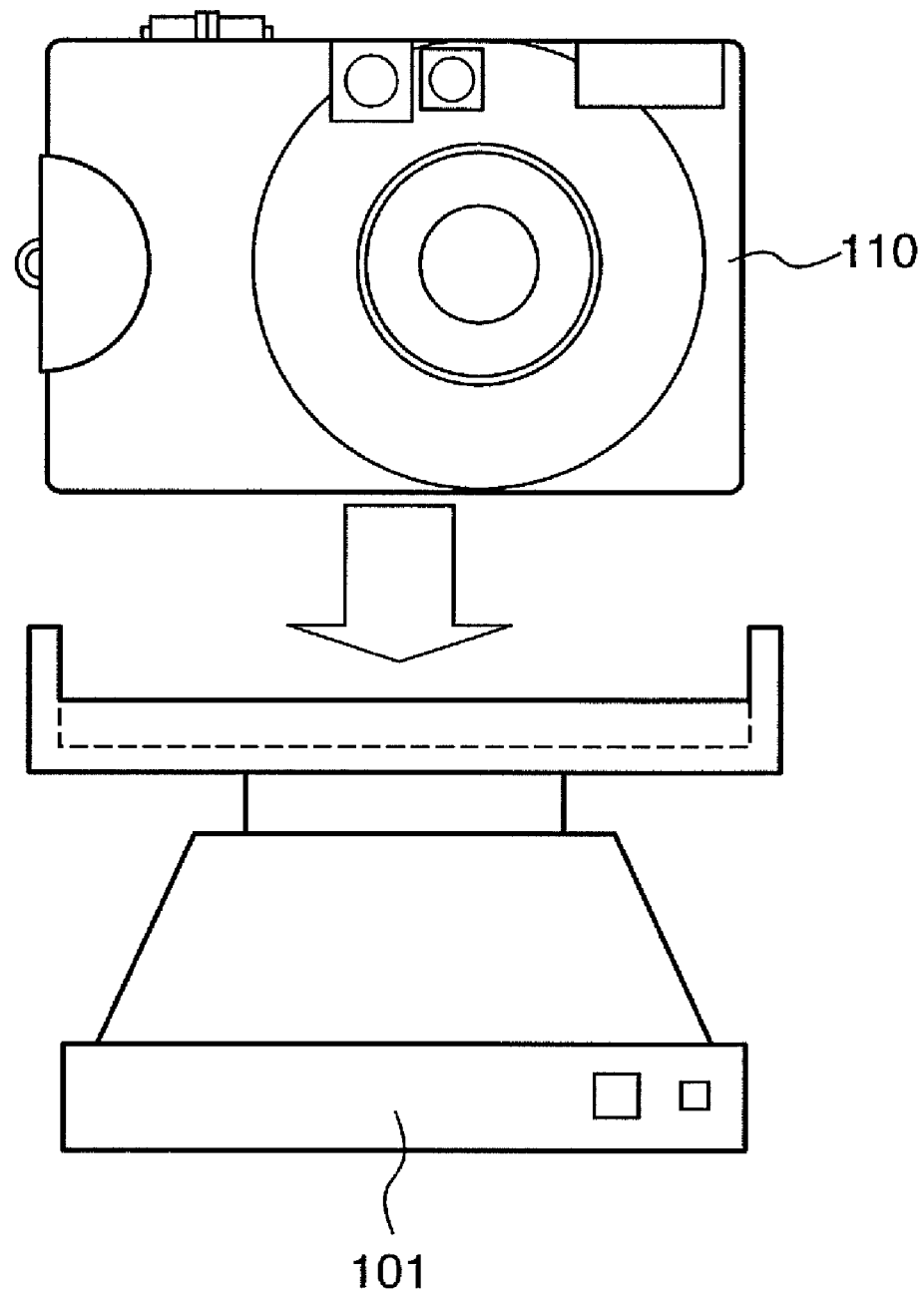
FIG. 17 depicts a perspective view showing an example of the video distribution apparatus having a digital camera.

FIG. 17 depicts a perspective view showing another construction of the video distribution apparatus 101 having the digital camera 110.

The video distribution apparatus 101 and the operation terminals 102 and 103 are connected to the network 105. Assuming that a video distribution request is transmitted from the operation terminal 102 via the AP 104 to the video distribution apparatus 101, when the request is received by the video distribution apparatus 101, video data is delivered from the video distribution apparatus 101 to the operation terminal 102, and the video image is played back on the operation terminal 102. Further, the content of instruction by operation such as temporary stop request or fast forward request in video content transmission is also transmitted as in the case of the video distribution request. A Network-Attached Storage (hereinbelow abbreviated to "NAS") 120 receives a data storage request or data referring request from another device connected to the network 105. The NAS 120 may be a home-use NAS, a commercial-use large-scale NAS or a storage service provided from another apparatus. Further, the network 105 is managed within a household or an organization. Further, a communication medium of the network 105 may be a cable or wireless communication.

FIG. 2 is a block diagram showing an example of the hardware construction of the video distribution apparatus 101 according to the present embodiment.

A CPU 201 controls the operation of the video distribution apparatus 101 in accordance with a program loaded onto a memory 202. A storage unit 204 holds various previously-installed programs. Upon execution of one of the programs, the program is loaded to the memory 202 and executed. Further, the results of various processings and the like are stored in the storage unit 204. A network interface (I/F) 203 establishes connection with the network 105 and transmits various data between the apparatus 101 and various devices connected to the network 105. A USB interface 205 connects an image sensing device 206 such as a digital camera via a USB. The storage unit 204 may have an HDD (hard disk) or a nonvolatile memory such as a flash memory in addition to the high speed RAM. Further, the storage unit 204 may have a removable storage. The network interface 203 may have a wireless interface in addition to the cable interface. Further, the interface for connection with the image sensing device 206 such as a digital camera is not limited to the USB but may be an IEEE 1394 interface.

Figure 3:
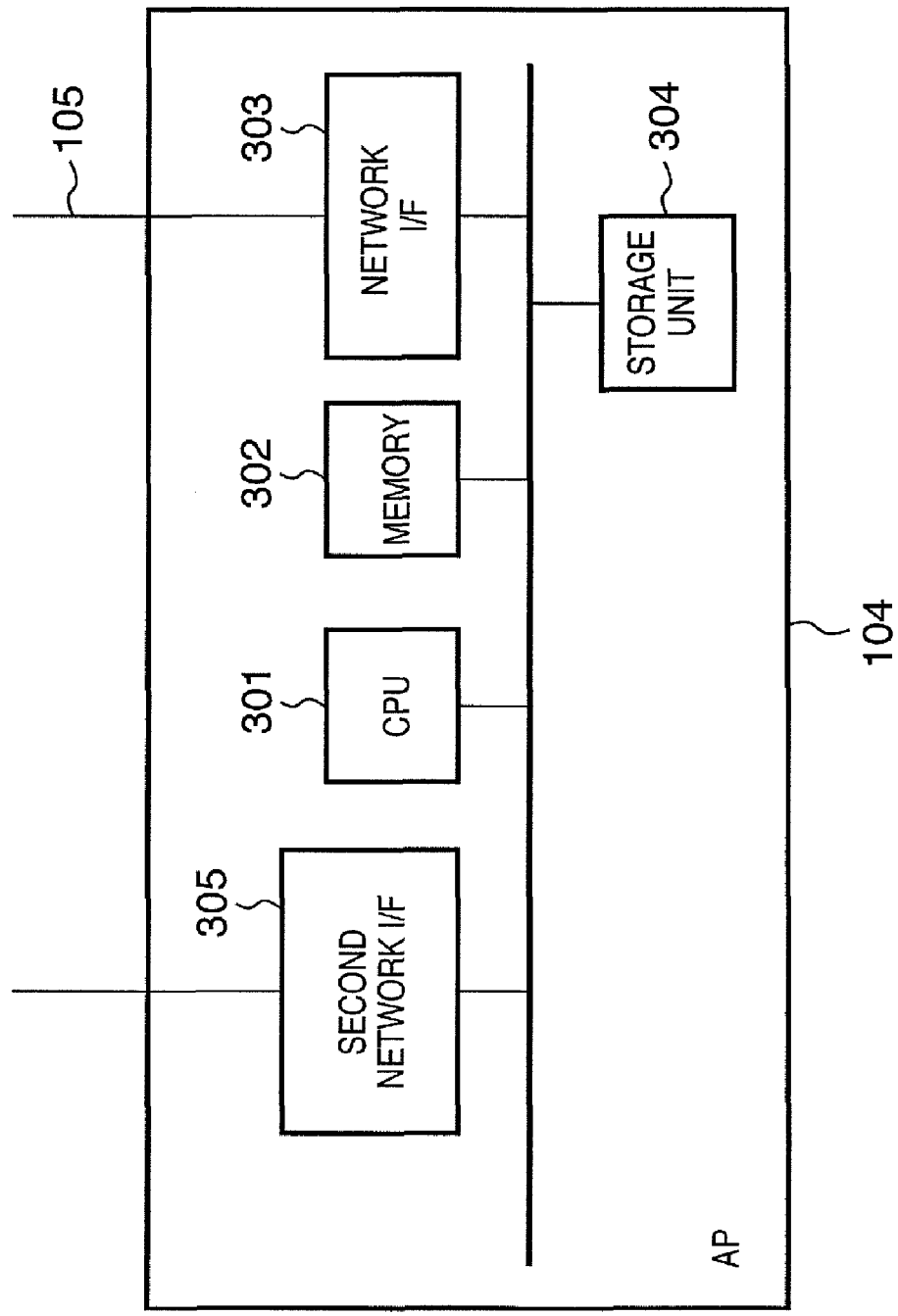
FIG. 3 is a block diagram showing an example of the hardware construction of an AP (Access Point) according to the first embodiment.

FIG. 3 is a block diagram showing an example of the hardware construction of the AP 104 according to the first embodiment.

A CPU 301 controls the operation of the AP 104 in accordance with a program loaded to a memory 302. A storage unit 304 holds various previously-installed programs. Upon execution of one of the programs, the program is loaded onto the memory 302 and executed. Further, the results of various processings and the like are stored in the storage unit 304. A network interface (I/F) 303 establishes connection with the network 105 and transmits various data between the AP 104 and various devices connected to the network 105. A network interface (I/F) 305 serves as an interface for another network. The storage unit 304 may have an HDD (hard disk) or a nonvolatile memory such as a flash memory in addition to the high speed RAM. Further, the storage unit 304 may have a removable storage. The network interfaces 303 and 305 may have a wireless interface in addition to the cable interface. Note that FIG. 3 shows the network interfaces 303 and 305, however, the number of the network interfaces is not limited to two.

Figure 4:
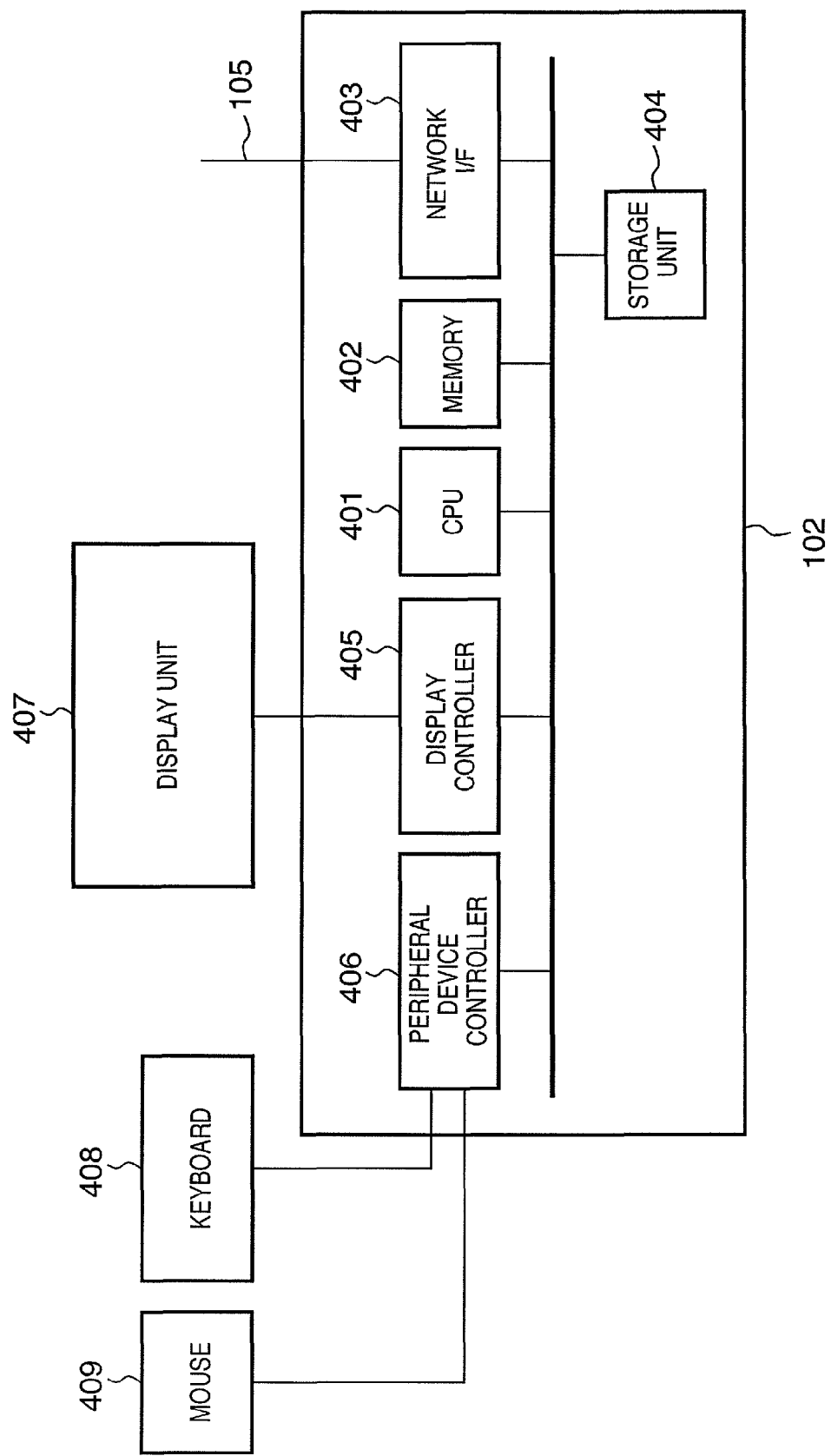
FIG. 4 is a block diagram showing an example of the hardware construction of an operation terminal according to the first embodiment.

FIG. 4 is a block diagram showing an example of the hardware construction of the operation terminal 102 (103) according to the present embodiment. Note that as the operation terminals 102 and 103 having the same construction, only the operation terminal 102 will be described below.

A CPU 401 controls the operation of the operation terminal 102 in accordance with a program loaded to a memory 402. A storage unit 404 holds various previously-installed programs. Upon execution of one of the programs, the program is loaded to the memory 402 and executed. Further, the results of various processings and the like are stored in the storage unit 404. A network interface (I/F) 403 establishes connection with the network 105 and transmits various data between the terminal 102 and various devices connected to the network 105. A display controller 405 controls display on a display unit 407. The display unit 407 displays the result of processing, a video content and the like. A peripheral device controller 406 receives a command inputted from a user by operating a keyboard 408 and/or a mouse 409. The storage unit 404 may have an HDD or a nonvolatile memory such as a flash memory in addition to the high speed RAM. Further, the storage unit 404 may have a removable storage. The network I/F 403 may have a wireless interface in addition to the cable interface. The peripheral device controller 406, which is connected to the keyboard 408 and the mouse 409, may be an infrared remote controller, an LED controller or an input/output controller using an external sensor.

Figure 5:
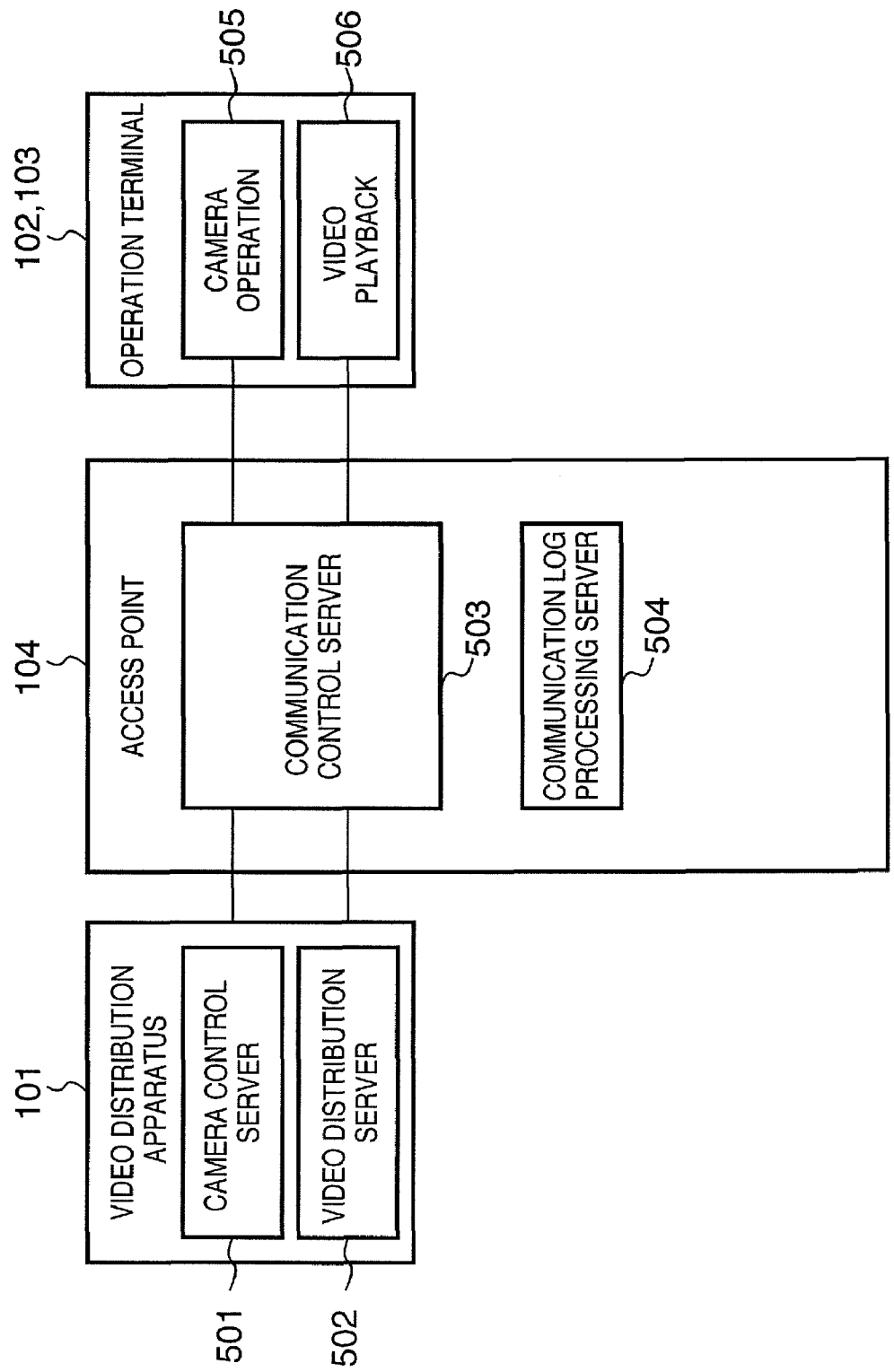
FIG. 5 is a block diagram showing a program construction of the system according to the first embodiment.

FIG. 5 is a block diagram showing a program construction of the system according to the first embodiment of the present invention.

The video distribution apparatus 101 includes a camera control server program 501 and a video distribution server program 502. The AP 104 includes a communication control server program 503 and a communication log processing server program 504. Further, the operation terminal 102 includes a camera operation program 505 and a video playback program 506. The programs are stored in the respective storage units, and executed under the control of the respective CPUs.

The commands that the video distribution apparatus 101 receives from the operation terminal 102 (103) via the network 105 are classified into the following categories:

(1) Session Command

Some commands require establishment of session between the video distribution apparatus 101 and the operation terminal 102 beforehand. Session control commands are defined for this purpose.

(2) Camera Control Command

Commands for transmission of control right of the image sensing device 206 connected to the video distribution apparatus 101 are defined for operation commands requiring exclusive control for access on the video distribution apparatus 101. For example, commands for zooming in the image sensing device 206 and distributed video deletion are defined. An operation terminal holding the control right is enabled to perform a control operation of the image sensing device 206. Note that in addition to the control of the image sensing device 206, the camera control right is required for a part of commands regarding the video distribution apparatus 101 (pan/tilt control of camera platform and the like), therefore these commands are included in this command category.

(3) Camera Browsing command

Commands for operations regarding the internal states (including storage contents such as stored video contents) on the video distribution apparatus 101 are defined.

(4) Camera Setting Command

Commands for operations to change various settings of the video distribution apparatus 101 are defined.

Next, the respective operation flows of the operational terminal 102, the AP 104 and the video distribution apparatus 101 will be described. Note that in the following description, the operation terminal 102 has already obtained information on access to the video distribution apparatus 101 and routing information to the en route AP 104. Since these information can be obtained by utilizing the well-known IP (Internet Protocol) technique, the UPnP technique, the Web (World Wide Web) technique and the like, the explanation of acquisition of these information will be omitted.

Figure 6:
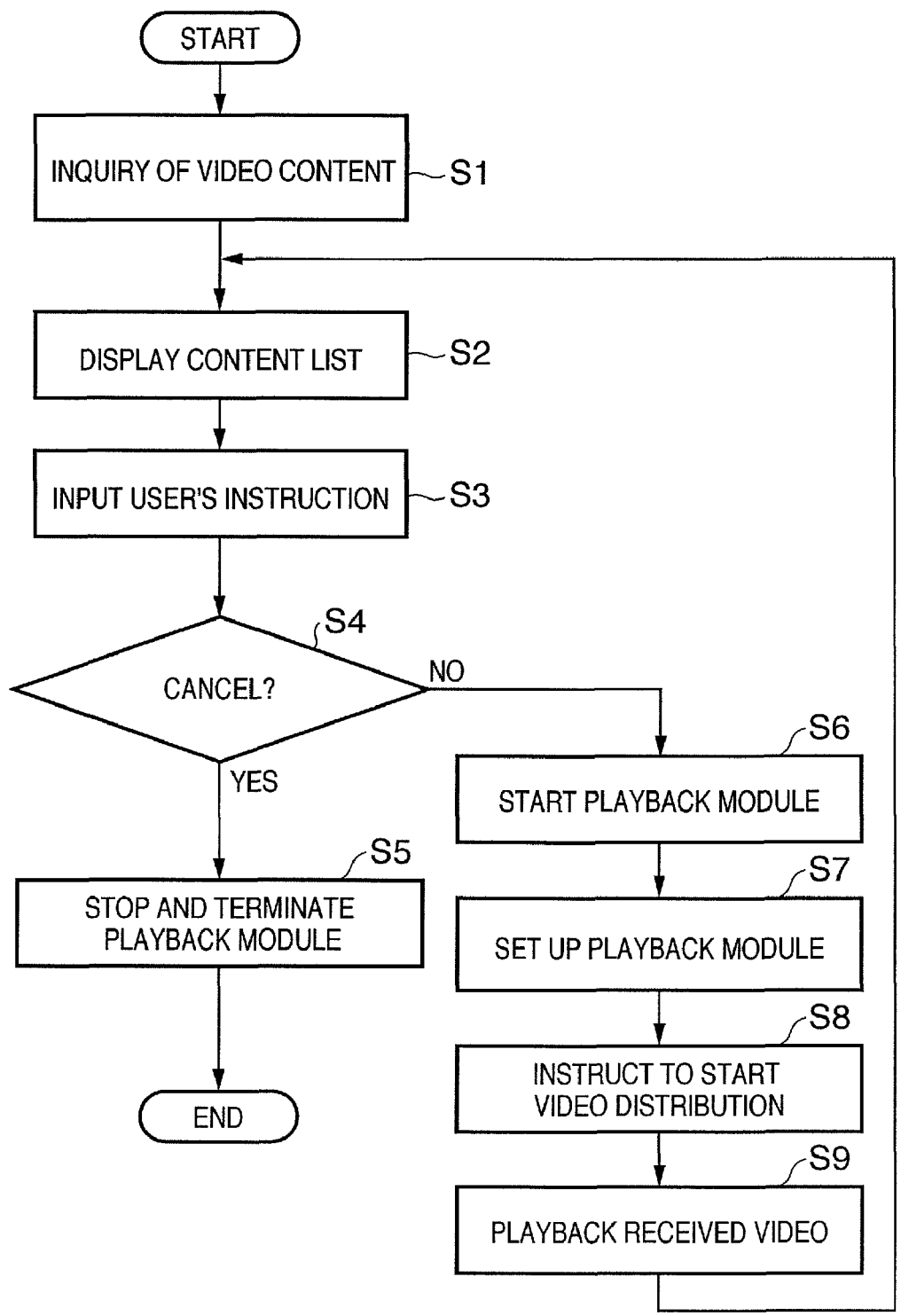
FIG. 6 is a flowchart showing processing by a video playback program in the operation terminal according to the first embodiment.

FIG. 6 is a flowchart showing processing by the video playback program 506 in the operation terminal 102 according to the present embodiment.

First, at step S1, an inquiry is made to the video distribution apparatus 101 about video contents which can be provided by the video distribution apparatus 101. The video contents include video contents stored in the video distribution apparatus 101 and live video contents obtained by the image sensing device 206. Further, attribute information indicating resolution, codec, playback time, data rate (bit rate), title, language and the like, access restriction attribution and the like, are attached to the video contents. Note that upon the inquiry at step S1, only a part of these attributes may be designated. Next, at step S2, a video contents list, formed based on a response from the video distribution apparatus 101 to the inquiry, is displayed on the display unit 407, and a reception of the user's selection instruction using the keyboard 408 and/or the mouse 409 is waited. When the user's selection instruction is received at step S3, the process proceeds to step S4, at which it is determined whether or not cancellation has been designated. When cancellation has been designated, the process proceeds to step S5, at which the process ends.

In a case that it is determined at step S4 that cancellation has not been designated, as a selection instruction from the list display has been made, the process proceeds to step S6, at which playback processing on a selected vided content is started. More particularly, to playback and display the video content, execution of a function module to repeat decoding, scaling, high image-quality processing and output to the display unit 407 of video frame data is started. Generally, this function module is executed in other thread than that of the video playback processing. Hereinbelow, the function module executed here will be referred to as a playback module.

Next, the process proceeds to step S7, at which various information necessary for the playback module are obtained, and setup of the playback module is made. The various information includes resolution, codec, copyright protection system (including encryption/decryption system) and the like. Next, at step S8, the video distribution apparatus 101 is instructed to distribute the video content to the operation terminal 102. Then at step S9, information sent from the video distribution apparatus 101 is received by the operation terminal 102 and continuously delivered to the playback module, thereby the video content is streaming-played back. When the distribution of the video content from the video distribution apparatus 101 has been completed, the process returns to step S2. When cancellation is designated, then at step S5, the playback module, if it is operating, is stopped, then the resource is released, and the video playback processing is terminated.

Note that upon delivery of video content to the playback module at step S9, processing of appropriately separating the video image and sound multiplexed on a communication channel and appropriately combining a packetized video bit stream is included. As the processing in the playback module is the same as general video bit stream playback processing, the explanation of the processing will be omitted. Further, in this example, the processing of the video playback processing is terminated in accordance with the cancellation operation, however, it may be arranged such that the process returns to step S1, S2 or S3 to wait for the user's instruction again.

Figure 7:
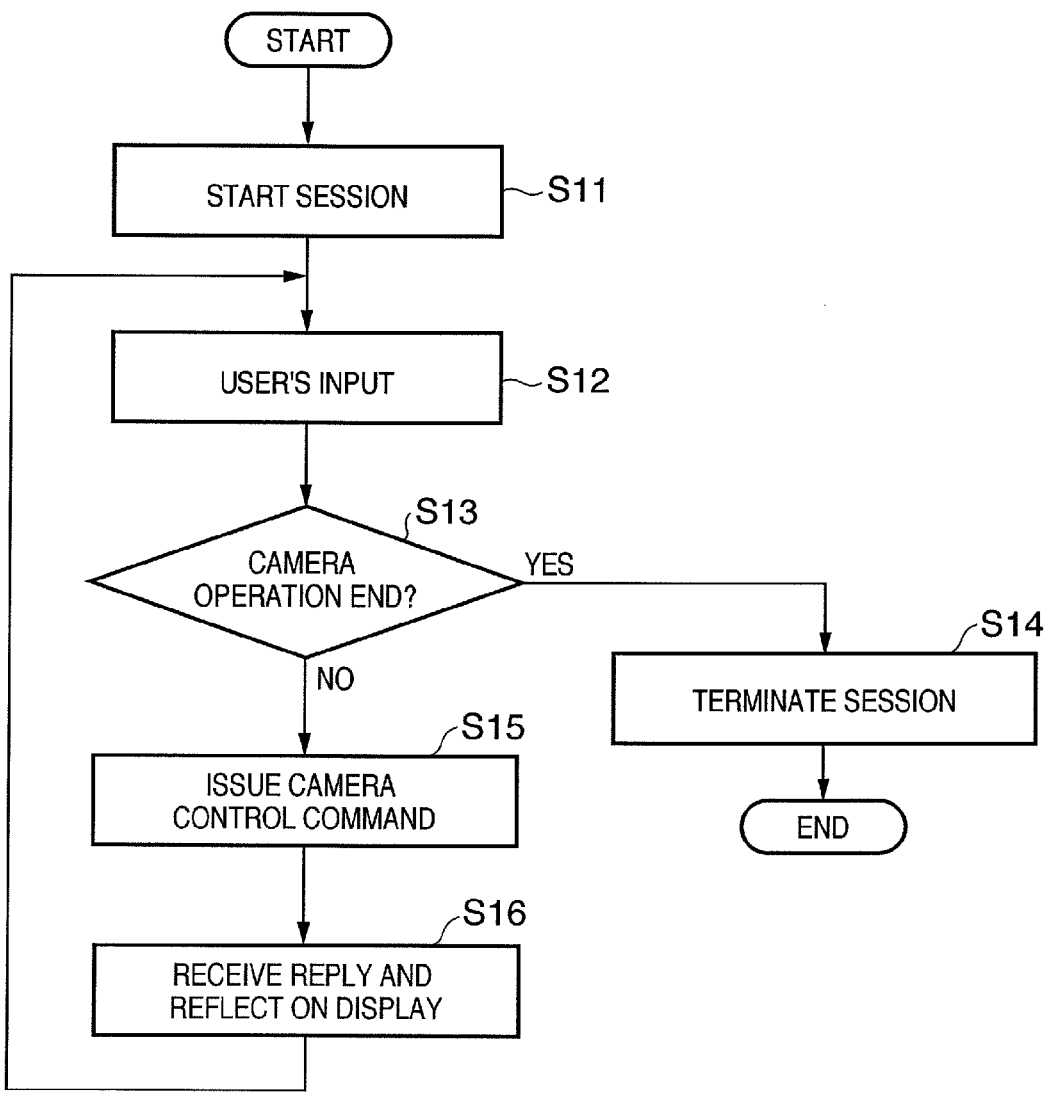
FIG. 7 is a flowchart showing processing by a camera operation program in the operation terminal according to the first embodiment.

FIG. 7 is a flowchart showing processing by the camera operation program 505 in the operation terminal 102 according to the present embodiment.

First, at step S11, a GUI regarding camera operation is displayed on the display unit 407. Then, a session is established between the camera and the video distribution apparatus 101 using the above-described session commands. Next, at step S12, an input of the user's camera operation instruction using the keyboard 408 and/or the mouse 409 is waited. When a camera operation instruction has been received from the user, the process proceeds to step S13, at which it is determined whether or not the user's instruction is camera operation termination instruction. If it is determined that the instruction is the camera operation termination instruction, the process proceeds to step S14, to terminate the session.

On the other hand, if is determined that the instruction is not the camera operation termination instruction, the process proceeds to step S15, at which a camera control command corresponding to the camera operation designated by the user is issued to the video distribution apparatus 101. Next, at step S16, a response to the issue camera control command is received from the video distribution apparatus 101. Then, processing corresponding to the response is performed, and is reflected on the display unit 407 of the operation terminal 102. Then, the processings at steps S12, S13, S15 and S16 are repeated until the camera operation terminal instruction is inputted.

Figure 8:
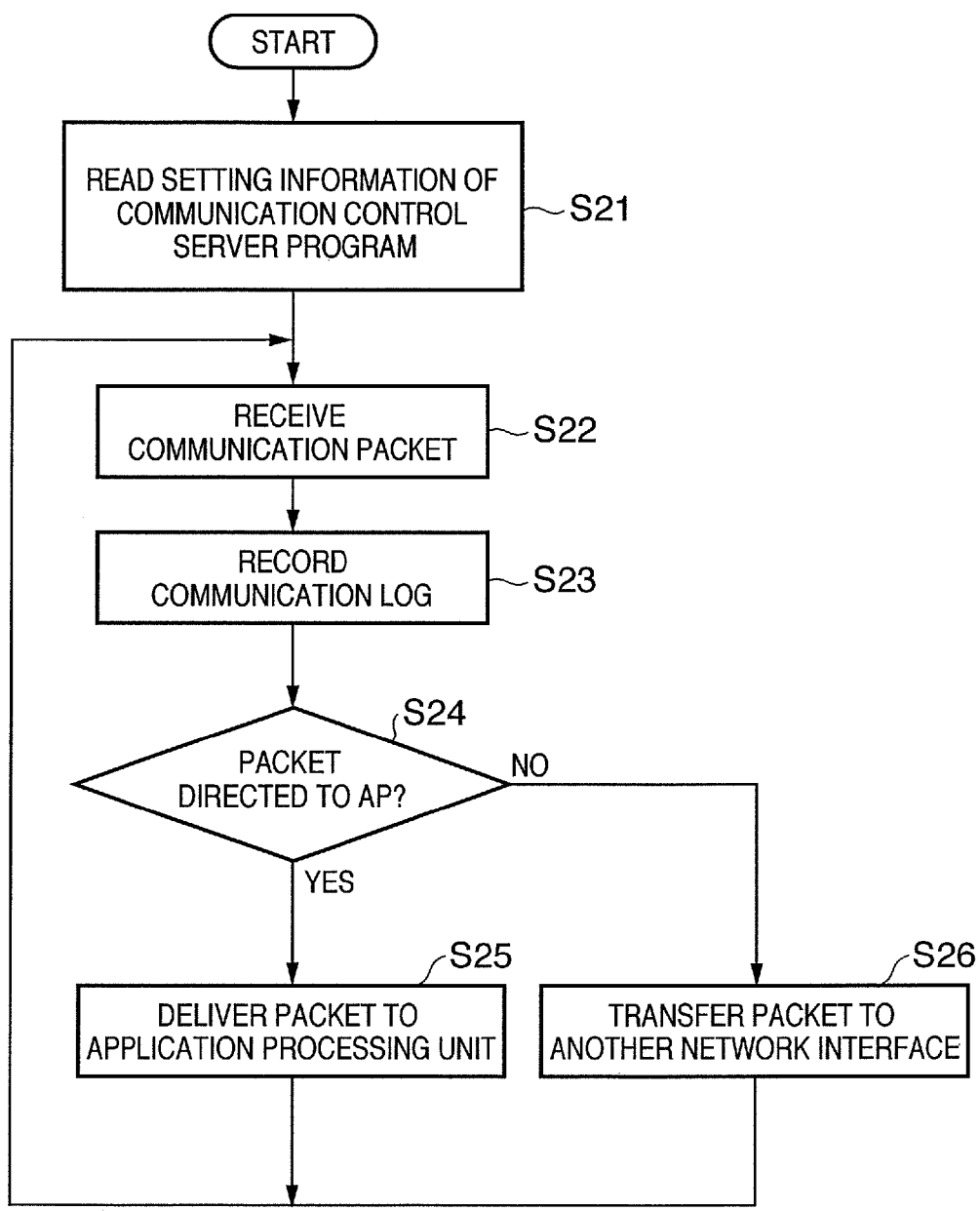
FIG. 8 is a flowchart showing a processing by a communication control server program in the AP according to the first embodiment.

FIG. 8 is a flowchart showing processing by the communication control server program 503 in the AP 104 according to the first embodiment.

First, at step S21, setting information of the communication control server program 503 is read, and it is reflected in setting information of the module of the network interface 303 or the like. The setting information is generally read from a nonvolatile memory such as the storage unit 304, however, the value may be read from a database or a directory service on the network 105. Next, at step S22, a communication packet is received from the network interfaces 303 or 305. Then at step S23, the content of the packet is recorded in the communication log processing server 504 to be described later. At step S24, it is determined whether or not the packet is directed to the AP 104 itself. If it is determined that the packet is directed to the AP 104, the process proceeds to step. S25, at which the packet is delivered to an application processing unit of the AP 104. The application processing unit includes an SNMP server, an AP setting server, an IGD (Internet Gateway Device) server and the like. In the present embodiment, the explanation of the application processing unit will be omitted.

On the other hand, if it is determined at step S24 that the packet is not directed to the AP 104, the process proceeds to step S26, at which a network interface is selected in accordance with a logical address or physical address included in the received packet, and the packet is transferred via the selected interface. At this time, the physical address means an Ethernet address at the MAC (Media Access Control) level or the like. The logical address means an IP address or the like. Further, in the case of multicasting, broadcasting or the like, the packet may be transferred to plural network interfaces. Thus, the processings at steps S22 to S24 and step S25 or S26 are repeated.

Note that at step S26, video media communication and non-media communication are distinguished from each other upon processing. The distinction can be made based on a packet header, communication destination/originator address, port number, the content of the payload and the like. If it is determined that non-media communication is performed regarding transfer timing control, the transfer is performed as quickly as possible (with best effort). On the other hand, if it is determined that video media communication is performed, the transfer timing is controlled such that the interval of the video media packet becomes a calculated time interval (in accordance with QoS control).

Further, when a dynamic filtering setting is designated from the communication log processing server program 504 to be described later, the following processing is made. At step S26, it is determined whether it is cancellation of transfer, change of network interface, transfer to the application processing unit, inquiry to the operation terminal or the like, in accordance with the set filtering. For example, even when access by a user (or the operation terminal 102) without access permission to video contents is rejected, the user's access control information is checked again. That is, when the user repeatedly accesses the same video content, the access control information of the user (or the operation terminal 102) is checked again by an inquiry to the operation terminal 102.

Figure 9:
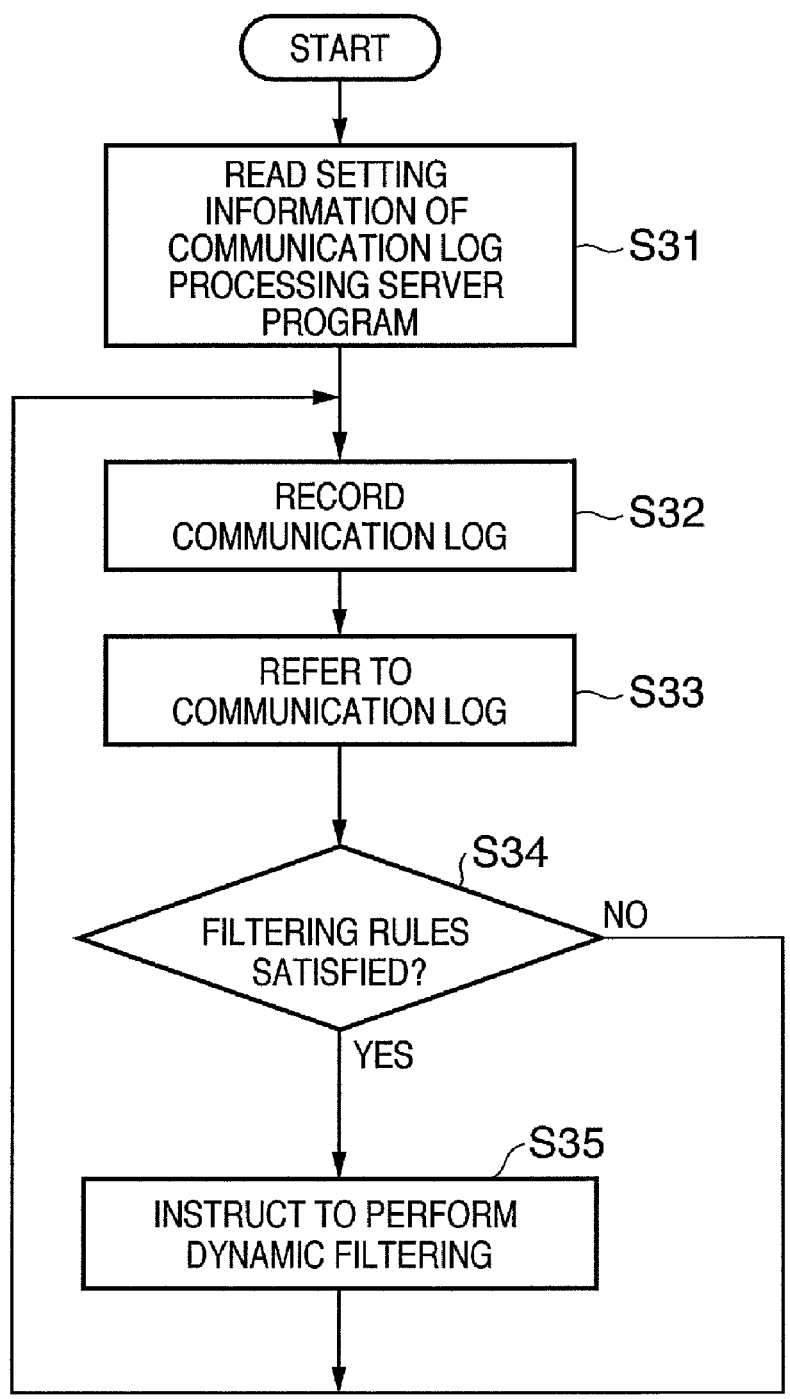
FIG. 9 is a flowchart showing processing by a communication log processing server program in the AP according to the first embodiment.

FIG. 9 is a flowchart showing processing by the communication log processing server program 504 in the AP 104 according to the first embodiment.

First, at step S31, setting information of the communication log processing server program 504 is read, and the setting information is reflected in appropriate modules such as the following log analysis and communication control. Next, at step S32, the content of communication of the packet obtained at step S23 (FIG. 8) of the communication control server program 503 is recorded as communication log information. The communication log obtained here is, e.g., as shown in the following "Collected Communication Log" below. In this example, the communication log information including five items, time, communication originator, destination, content ID and user ID, is recorded. Next, at step S33, the set filtering rules and previously-collected communication log information are referred to. Then at step S34, it is determined whether or not the set conditions are satisfied. If it is determined that the conditions are satisfied, the process proceeds to step S35, at which a predetermined dynamic filtering corresponding to the filtering rule executive portion is designated as the processing at step S26 (FIG. 8) of the communication control server program 503. The set filtering rules are, e.g., as shown in the following "Filtering Rules (Conditional Portion and Executive Portion)". In this manner, the processings at steps S32 to S35 are repeated.

[Collected Communication Log]
Time/Originator/Destination/Content ID/User ID
2005/04/02.13:24:10:07/00008522cd3a/0065b0ed5e4/ 71843/8 192
2005/04/02.13:27:34:18/00008522cd3a/0065b0ed5e4/ 71272/8 192
2005/04/02.13:28:22:43/00008522cd3a/00a0c92506d9/ 71659/5487
[Filtering Rules (Conditional Portion and Executive Portion)]

(1) A video content without access control information which has been first played back on a study PC (MAC_address=0065b0ed5e4) is accessible only from Father (user ID=8192).

(2) A video content without access control information which has been first played back on a living-room TV (MAC_address=00a0c92506d9) is content to be disclosed (without access control by user ID).

(3) Even a video content with access control information, when other access control than the set access control has been performed 3 times or more, the access control information is released.

Figure 10:
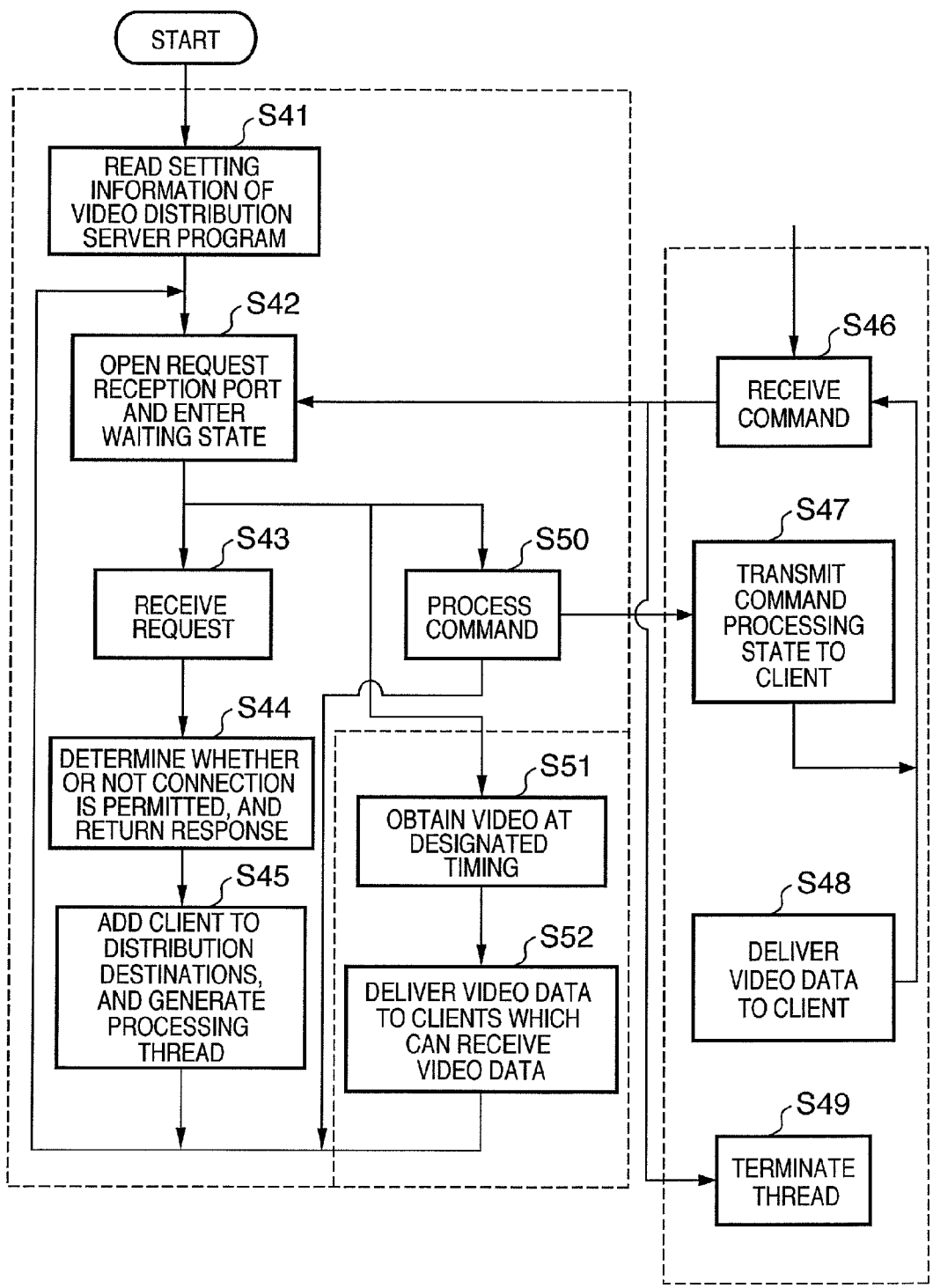
FIG. 10 is a flowchart showing processing by a video distribution server program in the video distribution apparatus according to the first embodiment.

FIG. 10 is a flowchart showing processing by the video distribution server program 502 in the video distribution apparatus 101 according to the present embodiment.

First, at step S41, the video distribution server program 502 reads its operation setting information, and starts operation based on the read setting information. At this time, a thread to perform video acquisition and encoding is generated (in a stopped state upon generation). Then at step S42, a request from the operation terminal 102 as a client is waited in a request reception status. When a request (a command request for video distribution, an encode parameter change, browsing or the like) is received, the process proceeds to step S43. If it is a connection request, it is determined at step S44 whether or not connection can be established. If NO, an error code indicating connection rejection is returned and the process returns to step S42. If YES, the process proceeds to step S45, at which a thread to perform processing for receiving a command from the client as connection processing is generated. Then the client is registered. When the thread to perform video acquisition and encoding is in the stopped state, start of operation is instructed, and the process returns to step S42.

In the threads corresponding to respective clients, generated as above, a command from the client is received at step S46. When the command has arrived, it is received and delivered to a main program to perform video processing. The main program performs processing in response to the command for encode parameter change, browsing or the like, proceeding from step S42 to step S50. At step S50, the command processing (setting change operation regarding video encoding or the like, browsing within the video distribution apparatus 101 or the like) is performed, and the result of processing (a code indicating success/failure of operation, the result of browsing or the like) is transmitted to the thread (S47) corresponding to the client that received the command request. At step S47, the thread corresponding to the client returns the result to the operation terminal 102 as the client.

On the other hand, at step S51, the main program obtains video data from the digital camera (image sensing device) 206 at predetermined time intervals in accordance with the instruction to start the operation to the thread to perform video acquisition and encoding. Then the video data is encoded in accordance with necessity. At step S52, the encoded data is transmitted to all the threads (S48) corresponding to the clients which can receive the encoded data. In the threads corresponding to the respective clients, it is determined whether or not there is a next video frame distribution request. If there is a distribution request, the encoded data is distributed to the client at step S48. When the thread corresponding to the client receives a next video frame distribution request (generally this request is returned in correspondence with the completion of video data reception in the client) from the client, a video frame distribution request flag is set. Further, when a connection termination command is received from the client at step S46, the command is transmitted to the main program. At the same time, the thread ends at step S49.

Figure 11:
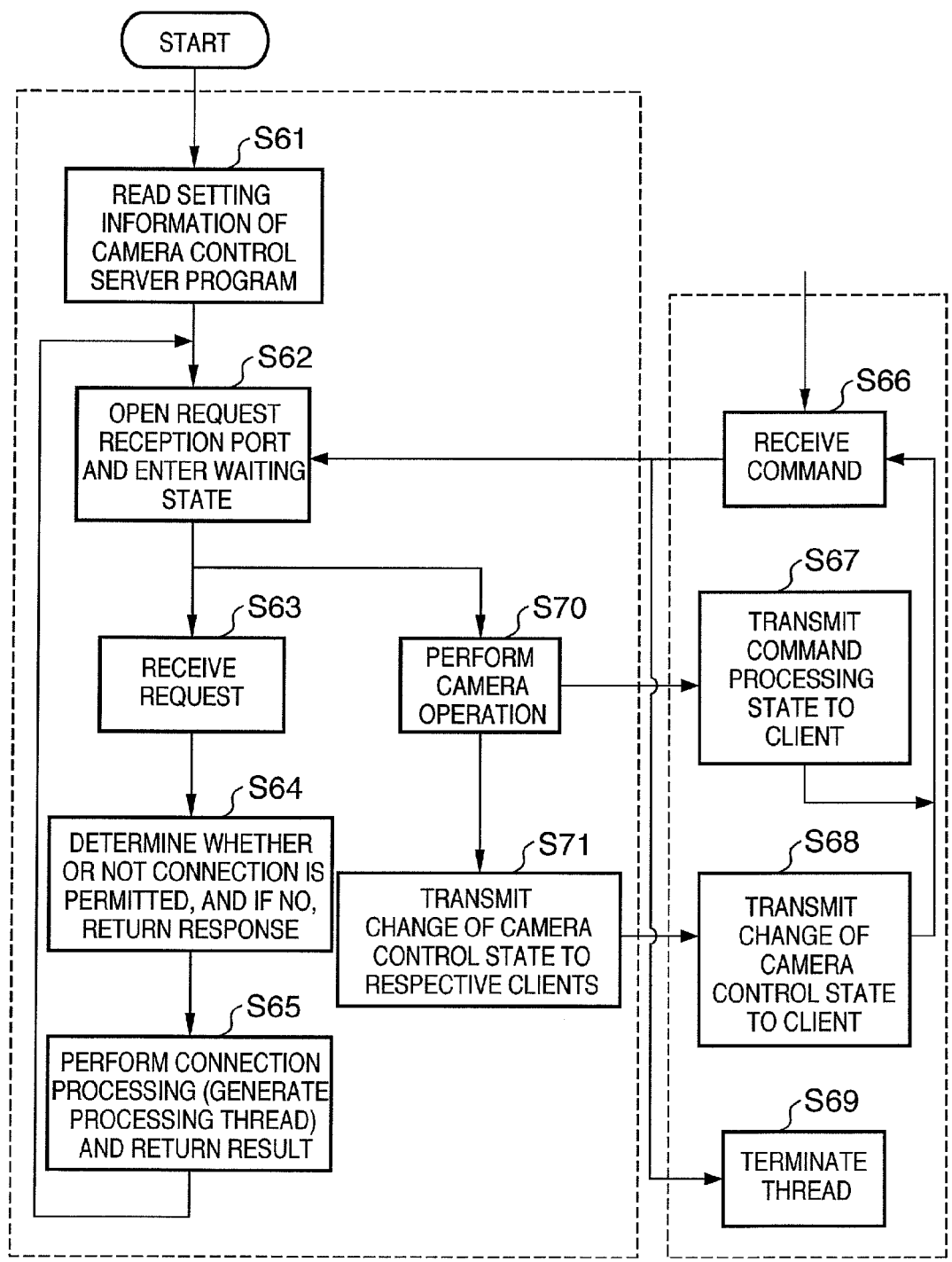
FIG. 11 is a flowchart showing processing by a camera control server program in the video distribution apparatus according to the first embodiment.

FIG. 11 is a flowchart showing processing by the camera control server program 501 in the video distribution apparatus 101 according to the present embodiment.

First, at step S61, operation setting information of the camera control server program 501 is read, and an operation is started based on the read setting information. At this time, a port to receive a request from the operation terminal 102 as a client is opened. Next, at step S62, the process enters a request reception state. When a request (a connection request or an operation request) is received, the process proceeds to step S63, at which the request is accepted. Next, at step S64, if the request is a connection request, it is determined whether or not connection is possible. If connection is impossible, an error code indicating connection rejection is returned, and the process returns to step S62. On the other hand, if connection is possible, the process proceeds to step S65, at which a thread to perform processing for reception of a command from the client as connection processing is generated. Then the client is registered, and the process returns to step S62. In the generated thread, an operation request from the corresponding client is received at step S66. In this example, when an operation request is received, it is accepted and delivered to the main program to perform camera operation. The main program receives the request at step S62. If the request is an operation request, the process proceeds to step S70, at which a camera operation is performed. Then the result of operation (a code indicating success/failure of the operation or the like) is transmitted to the thread corresponding to the client that received the camera operation request. The thread returns the result to the client at step S67.

On the other hand, the main program transmits the state changed by the camera operation (e.g., pan/tilt/zoom value(s)) to all the threads corresponding to the respective clients at step S71. The threads transmit the change of camera control state to the respective clients at step S68. Further, when the thread corresponding to the client receives a connection termination command from the client at step S66, the thread transmits the command to the main program, and the thread ends at step S69.

Note that upon handling of operation request, it may be arranged such that a camera operation right allocation request is required prior to issuance of particular operation request. This avoids confusion when plural users request camera operation. In this case, first, a client issues a camera operation right acquisition request command. In response to the request command, the camera control server program 501 selects rejection, allocation or waiting based on a current camera control right allocation state, and returns the selected response to the client. The camera control right is forfeited based on shorter one of a previously-determined particular time or time by termination of connection by a client having control right, and allocated to the next waiting client. The number of waiting clients is also limited to a previously-determined number (e.g., five), and requests from more clients are rejected. A client can issue an operation request during a time period from acquisition of camera control right to forfeit of the camera control right. The camera control server program 501 receives only an operation request from a client having camera control right.

Figure 12:
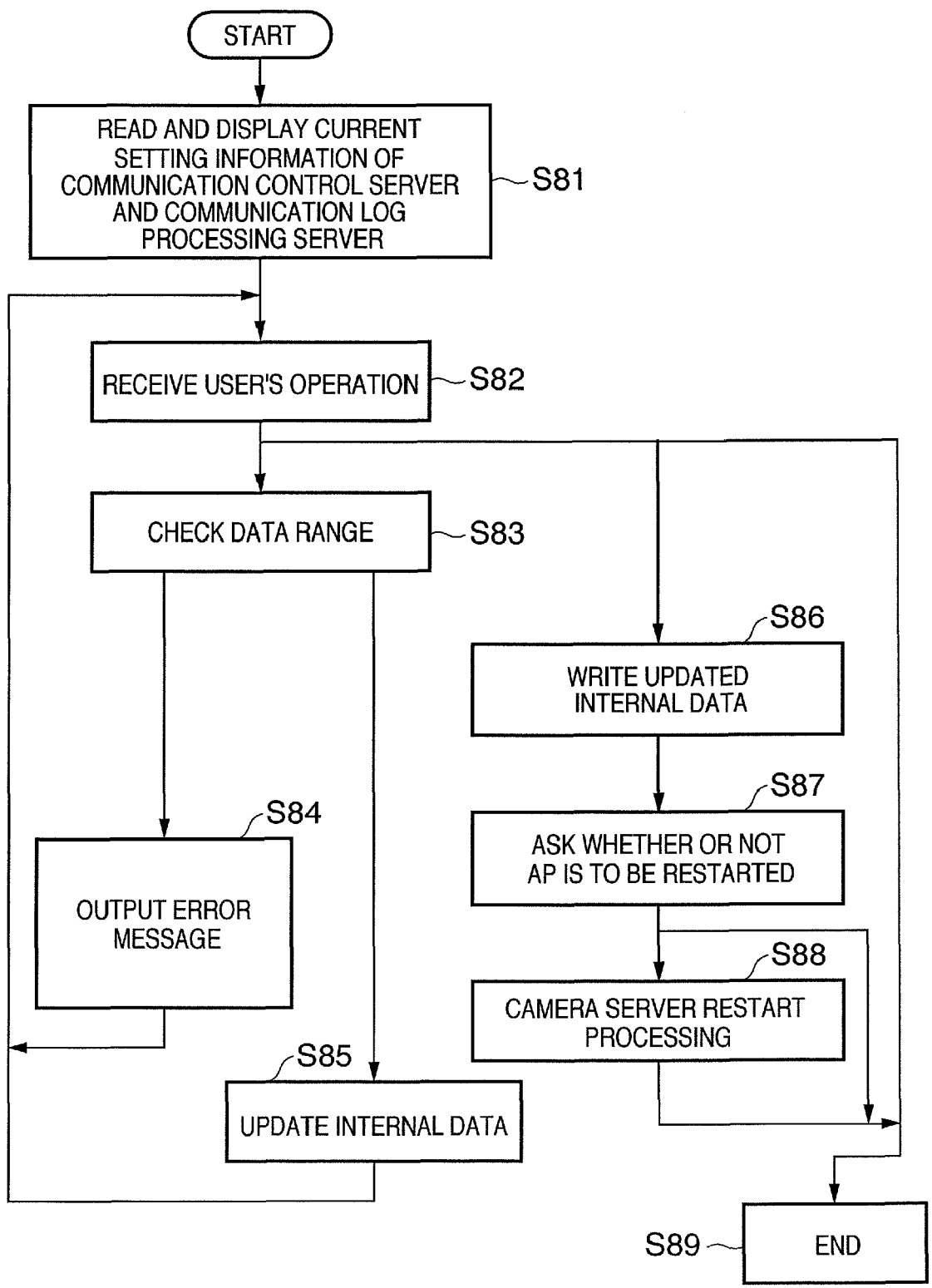
FIG. 12 is a flowchart showing AP setting processing according to the first embodiment.

FIG. 12 is a flowchart showing setting processing in the AP 104 according to the first embodiment.

First, at step S81, setting information regarding the communication control server program 503 and the communication log processing server program 504 is read. The setting information is stored in a particular file or a system database in a registry or the like. The setting information is set in the internal data. Then, the following loop to receive a user's operation input and reflect it in the internal data is repeated. That is, at step S82, an input by a user's operation is waited, and when a user's operation has been made, it is received. The process proceeds to step S83, at which validity, e.g., whether or not an input value is within an appropriate range, is determined. If the value is not adequate, the process proceeds to step S84, at which an error message is outputted. Then the value is reset, and the next user's input is waited. On the other hand, if the value is within the adequate range, the process proceeds to step S85, at which the internal data is updated and the process returns to step S82.

Further, if the user's operation is depression of an OK button, the process proceeds to step S86, at which the updated internal data is written on a particular file or the like holding the setting information regarding the communication control server program 503 and the communication log processing server program 504. Next, at step S87, a screen asking whether or not the AP 104 is to be restarted for reflection of the change is displayed. If restart is designated, the process proceeds to step S88, at which the communication control server program 503 and the communication log processing server program 504 are restarted. Next, at step S89, the setting program ends. Further, if restart is not performed at step S87, the process proceeds directly from step S87 to step S89, and the process ends. Further, if the user's operation at step S82 is depression of a cancel button, the process directly proceeds to step S89 and the process ends.

Note that the values which can be set in the communication control server program 503 and the communication log processing server program 504 of the AP 104 according to the present embodiment are IP network settings (IP address, subnet address, subnet mask, routing address, whether or not multicasting is possible, and the like) of the respective network interfaces, and band restriction (including QOS setting). Further, the values include encryption key information (IPv6 IPsec setting, wireless LAN WEP setting or the like), various settings of the SNMP server, the AP setting server, the IGD server and the like of the application processing unit. Further, the values include initial values of dynamic filtering settings, filtering rules, maximum holding period and maximum number of communication log information and the like.

In the above construction, upon playback of video contents originated from a video source on an operation terminal, communication state and communication log information are collected in a network access point (line concentrator) In this arrangement, access control and upload setting of video contents can be simplified. Especially, the feature of the first embodiment is that the AP automatically reflects attribute information of video playback request originator and playback time before it performs access control and/or access restriction.

In the first embodiment, the AP 104 is a cable network line concentrator (switching hub or the like), however, the first embodiment may be similarly described when the AP 104 is a wireless LAN access point.

Further, in the first embodiment, a video medium itself is also distributed via the AP 104, however, the video medium may be distributed without the AP 104. In this case, it may be designed such that only a stream control command (e.g., an RTSP PLAY request as a playback instruction, a play action described in a UPnPAV specification AV Transport service, or the like) is transmitted/received via the AP 104 as a subject of recording by the communication log processing server program 504.

Further, in the first embodiment, communication devices are identified using a MAC address in the communication log collection and filtering rules. However, the identification of communication devices is not limited to the MAC address. For example, an IP address or information in the application layer included in the payload of a communication packet may be used. Further, a WEP identifier upon wireless communication or an IPsec identifier upon VPN communication may be used.

Further, in the first embodiment, a video content is directly identified in the communication log collection and filtering rules. However, the video content may be indirectly derived and determined from the communication protocol or the information in the application layer included in the payload of a communication packet.

In the first embodiment, the access control is made by dynamic filtering of media transfer request (media playback time point) in accordance with communication log information by a line concentrator such as an access point. However, the access control may be performed in the preceding stage. For example, it may be arranged such that, upon acquisition of a video content list, the communication log information is referred to by video content, and only accessible video contents are listed on the operation terminal. Otherwise, the line concentrator such as an access point may dynamically filter transmitted video media data. For example, it may be arranged such that, among video media to receive multicast-distribution by RTP (Real-time Transport Protocol), only the distribution to a particular client (operation terminal) is selectively relayed or discarded by the line concentrator such as an access point.

In the first embodiment, in the filtering rules executive portion, binary values of access permission and access denial are set in the dynamic filtering. However, the dynamic filtering setting is not limited to these values. For example, it may be arranged such that filtering rules for calculating QoS (Quality of Service) control communication band allocation are prepared, and the dynamic filtering is set to allocate the calculated communication band. Further, the access control may be performed using the combination of dynamic filtering and copyright management system such as DTCP-IP.

In the first embodiment, the video content access control is set based on viewing log information of the viewer (user)/audio-visual device. However, the subject of viewing is not limited to the viewer/audio-visual device. For example, viewing time/viewing time period may be the subject of observation.

Further, when the operation terminal is movable (mobile), predetermined location information on the operation terminal (collected WLAN-AP information, GPS information or the like) may be the subject of observation.

Further, in the first embodiment, initial access control setting of video contents is "accessible". However, the initial status may be "inaccessible". In this case, at step S6 (FIG. 6) of the operation terminal video playback program 506, processing to detect access denial then display a user authentication dialog and check access right may be added.

Further, in the first embodiment, the access control is performed based on the filtering rules set in the access point within the local network. However, different filtering rules may be set in an access point of another network. For example, when video contents (DMS) are moved to another network (another home), another access procedure may be set (e.g., all the video contents are handled as private video contents, and only an access-permitted video can be played back).

Further, in the first embodiment, when the communication log processing server program 504 receives a request for record of packet communication content from the communication control server program 503, the communication log processing server program 504 refers to the communication log information and determines whether or not the filtering rules are applicable. However, the timing of determination is not limited to this timing. For example, the determination may be delayed until a communication packet of different user is detected. Further, the determination may be performed at intervals of e.g., 30 minutes.

Second Embodiment

In the second embodiment, as in the case of the first embodiment, the line concentrator (access point) which can grasp the communication contents of the network 105 collects communication log information, and the access control setting and video disclosure/nondisclosure setting are automatically made in accordance with the communication log information. As in the case of the first embodiment, the system according to the second embodiment has an access point as a line concentrator, a video distribution apparatus, an operation terminal and the like.

In the second embodiment, the line concentrator (access point) has a gateway function for connection to an external network such as the Internet, and the procedure for uploading video contents in a common directory on the Internet is simplified in accordance with communication log information.

Note that most of the network connection form, the hardware constructions of the respective devices and the respective software operations are as described in the first embodiment. However, the usage in FIG. 1, the hardware construction to operate the AP 104 in FIG. 3 and the processing by the communication log processing server program in the AP 104 in FIG. 9 are different from those in the first embodiment. Further, an AP 104a according to the second embodiment has a publishing server program to be described in FIG. 16.

Figure 13:
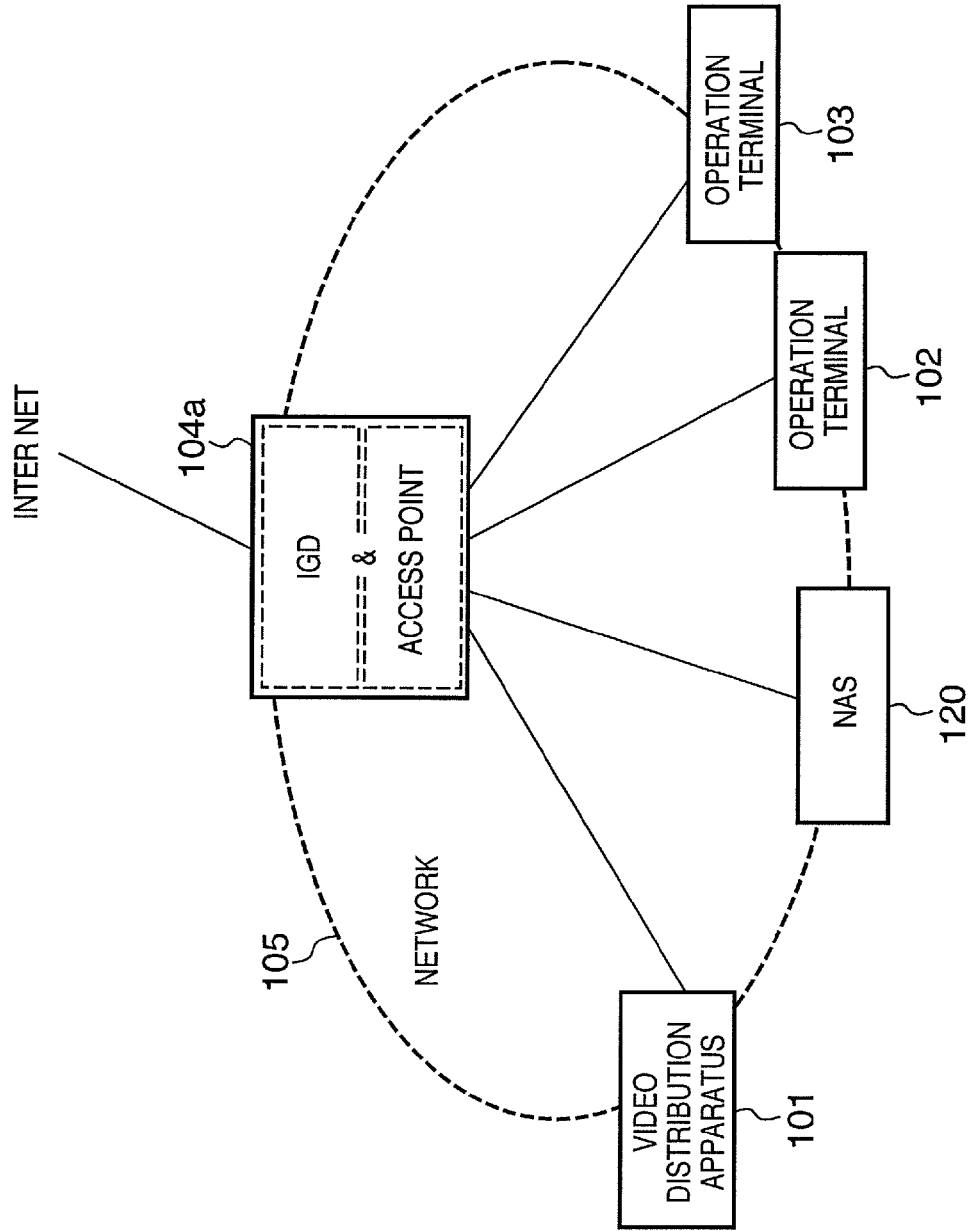
FIG. 13 is a block diagram showing the system according to a second embodiment of the present invention.

FIG. 13 is a block diagram showing the system according to the second embodiment of the present invention. In FIG. 13, the elements corresponding to those in FIG. 1 have the same reference numerals and the explanations of the elements will be omitted. The AP 104a according to the second embodiment is connected to the local network environment as in the case of the first embodiment, and is also connected to the Internet as an internet gateway.

Figure 14:
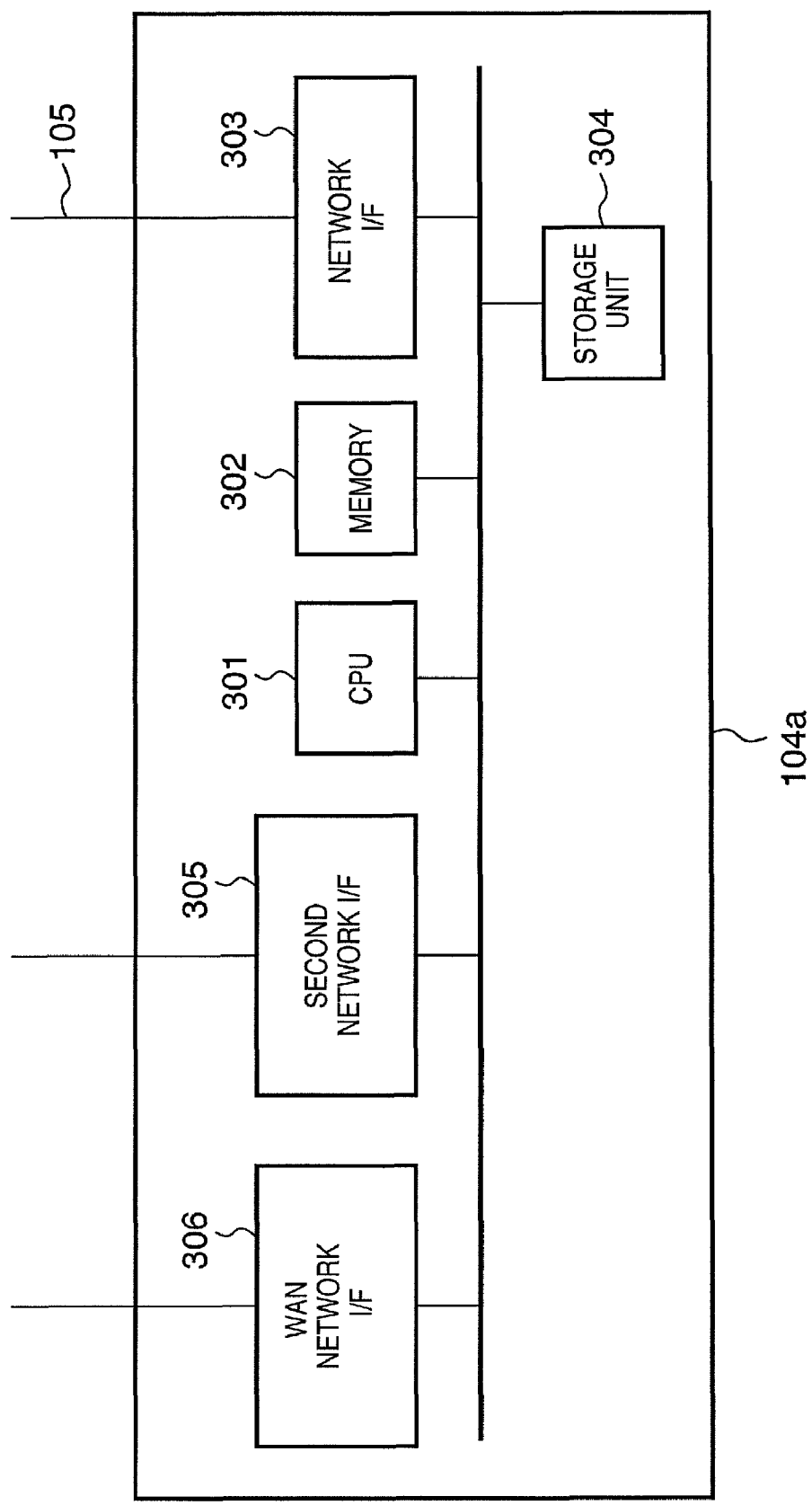
FIG. 14 is a block diagram showing the hardware construction of the AP according to the second embodiment.

FIG. 14 is a block diagram showing the hardware construction of the AP 104a according to the second embodiment. In FIG. 14, the elements corresponding to those in FIG. 3 have the same reference numerals.

The AP 104a according to the second embodiment has an IGD (Internal Gateway Device) function, and a network interface 306 as one of the network interfaces of the AP 104a is a WAN (Wide Area Network) interface to realize Internet connection. Note that in FIG. 14, only the WAN network interface 306 is shown, but the number of the WAN network interfaces is not limited to one.

Figure 15:
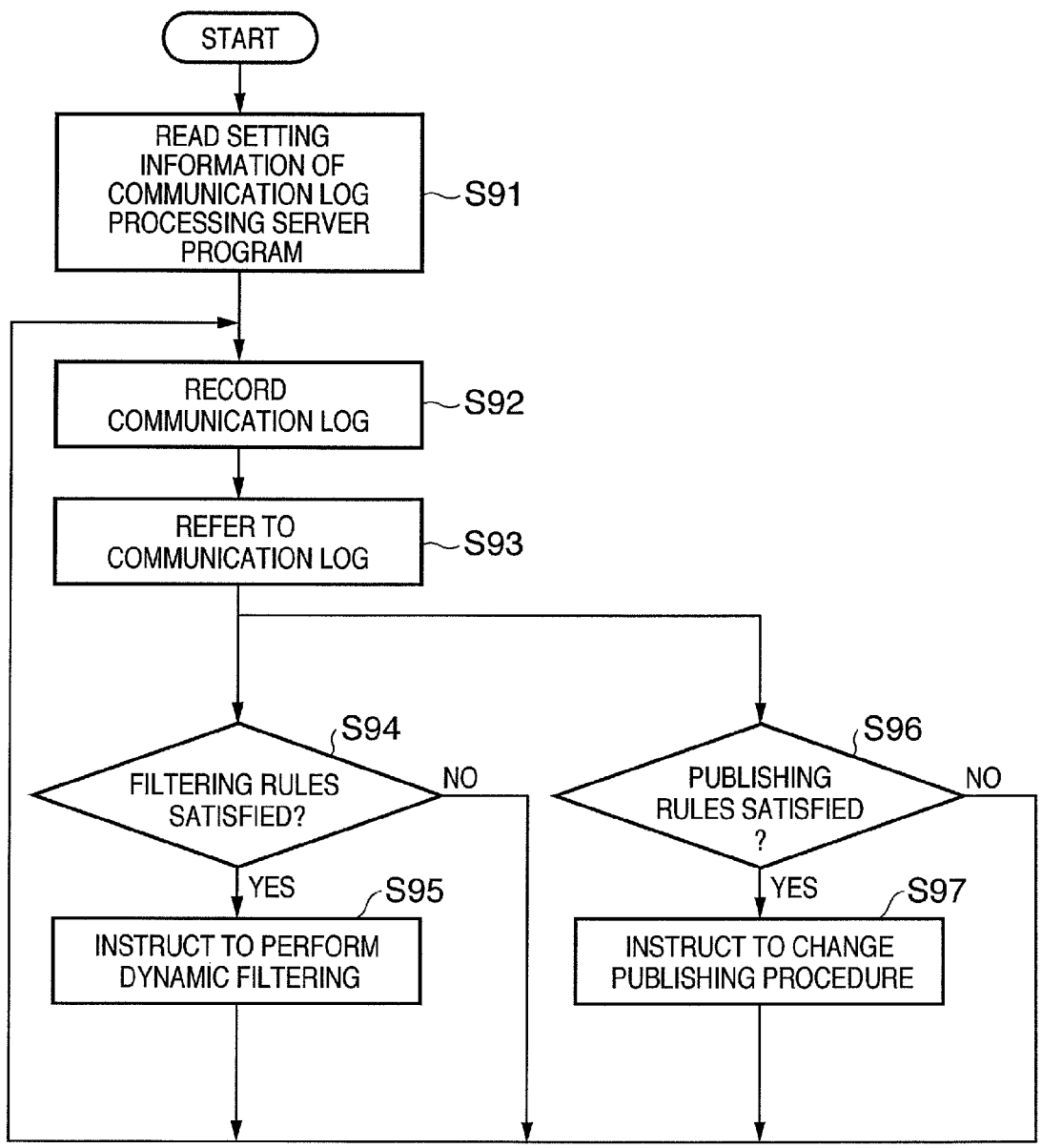
FIG. 15 is a flowchart showing processing by the communication log processing server program in the AP according to the second embodiment.

FIG. 15 is a flowchart showing processing by the communication log processing server program 504 in the AP 104a according to the second embodiment. As steps S91 to S95 are the same as steps S31 to S35 of the flowchart shown in FIG. 9, the explanations of steps S91 to S95 will be omitted.

At step S93, the communication log processing server program 504 in the AP 104a according to the second embodiment refers to the set filtering rules, the publishing rules and the previously-collected communication log information. Then at step S96, it is determined whether not the publishing rules are satisfied. If it is determined that the publishing rules are satisfied, the process proceeds to step S97, at which the publishing server program (FIG. 16) to be described later in the AP 104a changes a processing procedure for publishing video contents of the local network 105 on the Internet.

Figure 16:
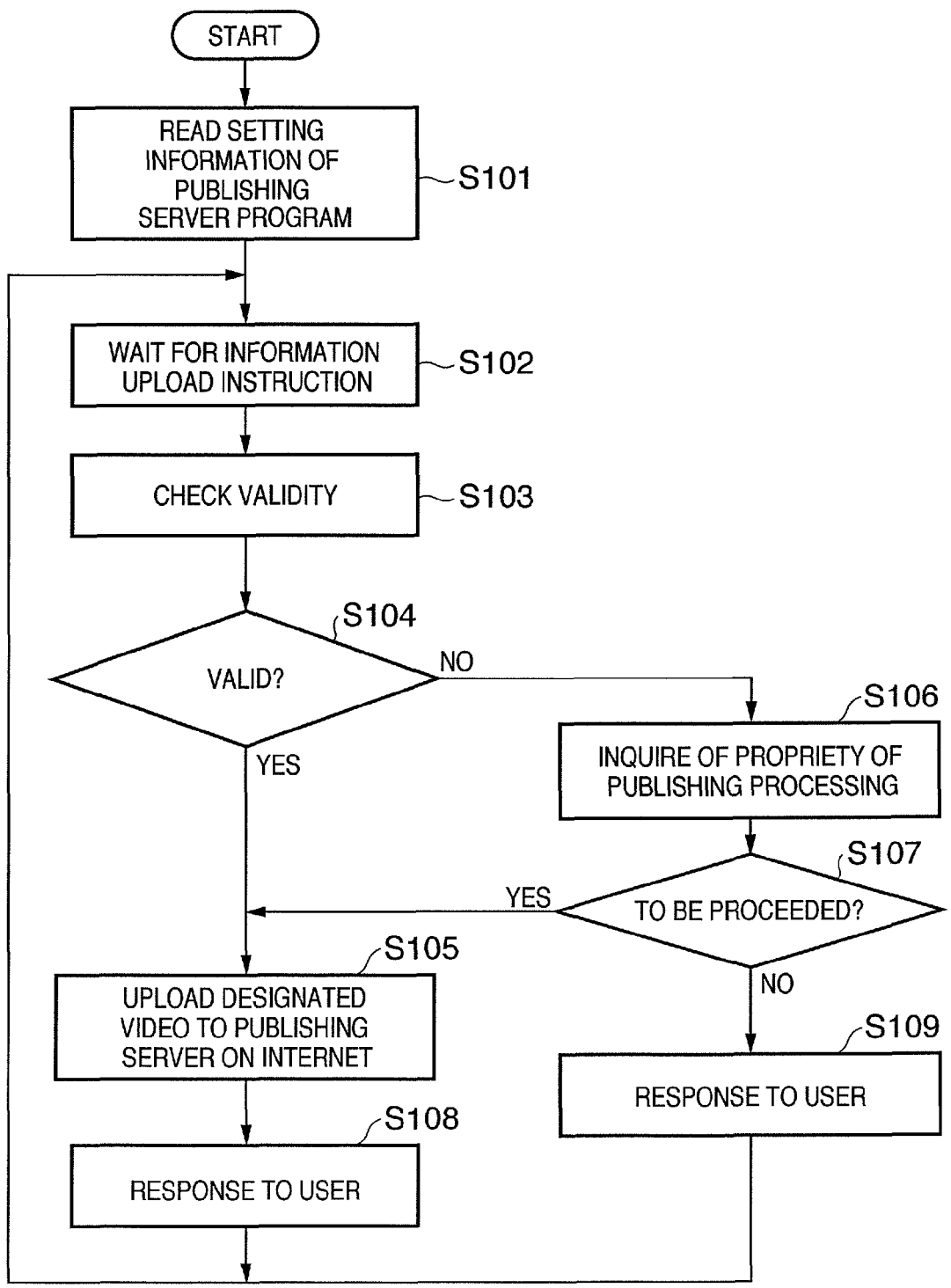
FIG. 16 is a flowchart showing processing by an information upload processing server program in the AP according to the second embodiment.

FIG. 16 is a flowchart showing processing by the publishing server in the AP 104a according to the second embodiment.

First, at step S101, the setting information regarding the publishing server program is read and set in the internal data. The setting information includes information on connection to a publishing server (not shown) on the Internet and authentication information. Further, the set information includes a list of users with permission to access the publishing server in the local network 105. Next, at step S102, an information upload instruction is waited. When the information upload instruction is issued, the instruction is received, and the validity of the instruction is checked at step S103. The validity is checked from the attributes of video data to be uploaded, the attributes of the user who issued the instruction, the communication log information held in the AP 104a and the like. Next, at step S104, if it is determined that the instruction is valid, the process proceeds to step S105. On the other hands if it is determined that the instruction is invalid, the process proceeds to step S106, at which an inquiry is made about acquisition of information upload right by the user who issued the instruction. Then it is determined whether or not the information upload is to be proceeded at step S107. If it is determined that the information upload is to be proceeded, the process proceeds to step S105. If it is determined at step S107 that the information upload is not to be proceeded, the process proceeds to step S109, at which a message indicating the failure of the information upload is returned to the user who issued the instruction. Then the process returns to step S102.

If it is determined at step S104 that the instruction is valid, the process proceeds to step S105, at which connection to the publishing server on the Internet is established, and the designated video data is uploaded to the information disclosure server. More particularly, the video data is copied (put) on the publishing server using the ftp protocol. Then at step S108, the result of connection and upload to the publishing server is returned to the user who issued the instruction. At the same time, the result of information upload is recorded as communication log information in the communication log processing server program 504.

In the publishing server program in the AP 104a according to the second embodiment, the validity of the instruction is checked at step S103, and the communication log information held in the AP 104a is referred to. Then, when log information on playback in the living room TV (MAC_address=00a0c92506d9) exists, checking-inquiry to the user who issued the instruction is skipped, and the uploading to the publishing server is proceeded.

In the above construction, the line concentrator (access point) 104a which can grasp the communication contents on the network 105 collects communication log information, and the access control and information upload/non-upload setting can be automated in accordance with the communication log information. Particularly in the second embodiment, the system includes a gateway device for connection to the external network such as the Internet, and the procedure upon upload of video data in a common directory on the Internet can be simplified in accordance with communication log information.

In the second embodiment, the publishing server program directly uploads a designated video content to a publishing server on the Internet thereby discloses the video contents. However, the publishing of information is not limited to this arrangement. For example, the IGD may be controlled so as to permit access to the video distribution apparatus 101 on the local network from the Internet side. This arrangement can be realized using a port mapping adding function (AddPortMapping) of the IGD.

Further, in the second embodiment, the publishing server program copies a video content designated to be published in the publishing server on the Internet thereby simply publishes the video contents. However, it may be arranged such that an information upload instruction to set conditions for uploading on the publishing server is supplied from the communication log processing server program. For example, in an initial information upload instruction, the publishing period on the publishing server may be limited to 24 hours, then, upon detection of communication log information indicating plural use of the same video content, the publishing period may be prolonged.

Further, in the second embodiment, upon publishing of a video image, which has been played back on the living room TV once, a checking-inquiry to the user is skipped. However, the condition for publishing simplification is not limited to this condition. For example, the checking-inquiry to the user may be omitted when plural viewings on the living room TV have been observed as communication log information.

Further, in the second embodiment, the publishing/non-publishing setting or access control of the entire video content has been described. However, the subject of publishing/non-publishing setting or access control is not limited to the entire video contents. For example, a part of video content (segment) may be the subject of setting, or a group of plural video contents may be the subject of setting. Further, it may be arranged such that a fast-forwarded (FF) portion as communication log information is omitted from the subject of setting, on the other hand, only a normally-viewed portion is handled as the subject of (private or publishing) access control setting. Further, it may be arranged such that the subject of access control setting is cut out and a video clip is generated, and private or publishing access control is set regarding the video clip.

Other Embodiment

The present invention can be applied to a document search system constituted by a plurality of devices or to a document search apparatus comprising a single device.

Note that the object of the present invention can also be achieved by providing a software program for realizing the functions of the above-described embodiments to a system or an apparatus directly or from a remote place, reading the program with a computer of the system or apparatus then executing the program. In such case, the program is not necessarily the form of program as long as it has functions of the program.

Accordingly, the program code installed in the computer to realize the functional processings of the present invention constitutes the invention. That is, the claims of the present invention include the computer program to realize the functional processings of the present invention. In such case, as long as the system or apparatus has the functions of the program, the program may be executed in any form, such as an object code, a program executed by an interpreter, or script data supplied to an operating system.

Example of storage media that can be used for supplying the program are a floppy (registered trademark) disk, a hard disk, an optical disk, a magneto-optical disk, an MO, a CD-ROM, a CD-R, a CD-RW, a magnetic tape, a non-volatile type memory card, a ROM, and a DVD (a DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, the program read from the storage medium may be written to a function expansion board inserted into the computer or to a memory provided in a function expansion unit connected to the computer. In this case, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-380169, filed Dec. 28, 2005, which is hereby incorporated by reference herein in its entirety.

What is claimed is:

1. A communication apparatus comprising:
a collection unit configured to collect playback communication log information of video contents played back via a network including a source of video contents and a playback terminal to receive video contents distributed from the source of video contents and play back the video contents;
a rule setting unit configured to set a filtering rule of video contents, wherein the filtering rule includes an executive portion and a conditional portion, and the executive portion determines an access right of video contents in accordance with the conditional portion;
a storage unit configured to store the playback communication log information collected by the collection unit; and
an access right setting unit configured to analyze the playback communication log information stored in the storage unit to determine the access right of the video contents based on the executive portion and the conditional portion of the filtering rule of the video contents set by the rule setting unit and an analysis result of the playback communication log information.

2. An apparatus according to claim 1, wherein the playback communication log information includes at least one of a playback communication time of the video contents, a source of the video contents, a distribution destination, identification information of the video contents, identification information of the playback terminal, user identification information, the number of playback times of the video contents, a playback portion of the video contents and a group of the video contents.

3. An apparatus according to claim 1, wherein the source of video contents is one of a storage connected to the network and an image sensing device.

4. An apparatus according to claim 1, wherein the communication apparatus includes one of a hub and a router of a cable network, an access point of a wireless network, a residential gateway having an Internet gateway function.

5. An apparatus according to claim 1, wherein the access right setting unit sets a publishing procedure of the video contents for a video sharing service.

6. An apparatus according to claim 1, wherein the access right setting unit sets QoS conditions in video distribution.

7. A communication apparatus control method, comprising:
a collection step of collecting playback communication log information of video contents played back via a network including a source of video contents and a playback terminal to receive video contents distributed from the source of video contents and play back the video contents;

a rule setting step of setting a filtering rule of video contents, wherein the filtering rule includes an executive portion and a conditional portion, and the executive portion determines an access right of video contents in accordance with the conditional portion;

a storage step of storing the playback communication log information collected in the collection step; and an access right setting step of analyzing the playback communication log information stored in the storage unit to determine the access right of the video contents based on the executive portion and the conditional portion of the filtering rule of the video contents set in the rule setting step and an analysis result of the playback communication log information.

8. A control method according to claim 7, wherein the playback communication log information includes at least one of communication time of the video contents, a source of the video contents, a distribution destination, identification information of the video contents, identification information of the playback terminal, user identification information, the number of playback times of the video contents, a playback portion of the video contents and a group of the video contents.

9. A control method according to claim 7, wherein in the access right setting step, a video content publishing procedure for a video sharing service is set.

10. A control method according to claim 7, wherein in the access right setting step, QoS conditions in video distribution are set.

11. A non-transitory computer-readable storage medium storing a program for causing a computer to perform the control method defined in claim 7.

* * * * *